May 13, 1969     R. T. McBRIDE     3,443,980
PROCESS OF PRODUCING LAMINAR FILM STRUCTURES
Filed April 15, 1966
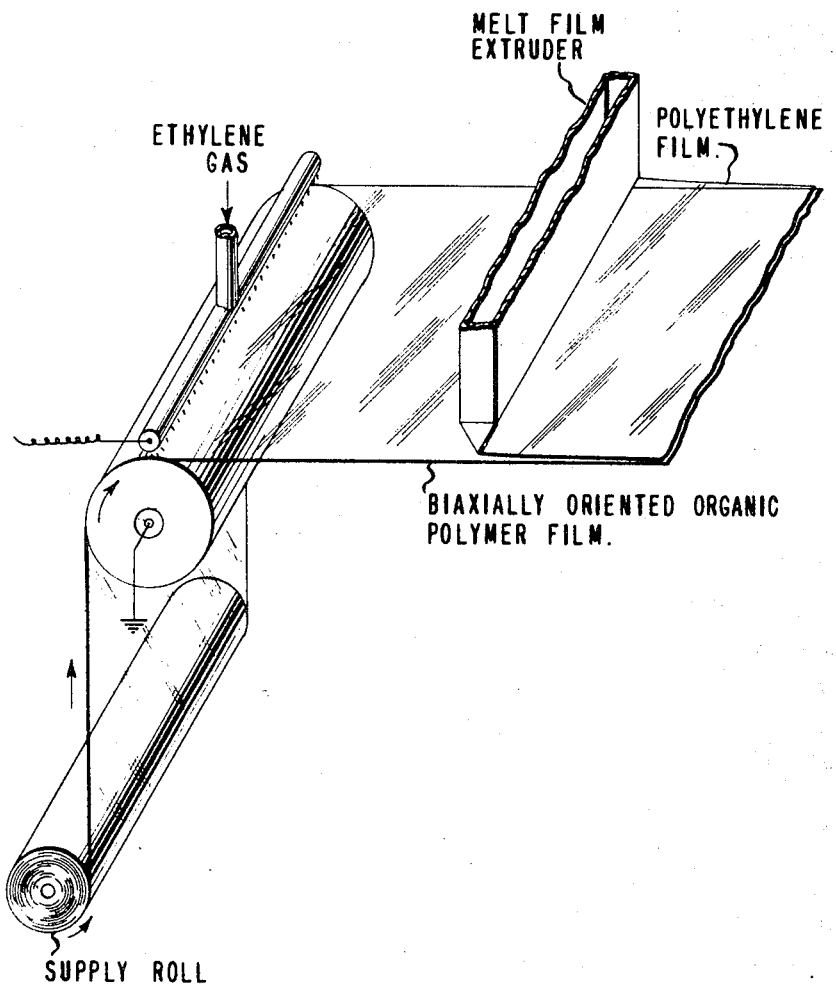
INVENTOR
RICHARD T. McBRIDE
BY *A. Ralph Snyder*
ATTORNEY United States Patent Office 3,443,980
Patented May 13, 1969

3,443,980
PROCESS OF PRODUCING LAMINAR FILM STRUCTURES
Richard T. McBride, Buffalo, N.Y., assignor to E. I. du Pont de Nemours and Company, Wilmington, Del., a corporation of Delaware
Filed Apr. 15, 1966, Ser. No. 542,830
Int. Cl. H01t 19/04; B32b 31/04, 31/30
U.S. Cl. 117—47                        4 Claims This invention is concerned with laminar packaging film and more particularly with laminar film, suitable for boil-in-bag applications, comprising a layer of an ethylene polymer on a substrate of a biaxially oriented film of an organic polymer.

It is a principal object of this invention to provide a process for producing a laminar film structure of polyethylene with a biaxially oriented film of organic polymer which would be suitable for packing applications requiring exposure to highly moist and elevated temperature conditions. The foregoing and related objects will more clearly appear from the description which follows.

These objects are realized by the present invention which, briefly stated, comprises subjecting a biaxially oriented film of an organic polymer to the action of a pulsating electrical discharge between spaced electrodes at substantially atmospheric pressure and at an ambient temperature between about 20° C. and about 60° C., in an atmosphere consisting of an olefin hydrocarbon selected from the group consisting of ethylene and propylene, the electrical discharge between the electrodes being produced by a high frequency spark generator characterized by voltages pulsating from about 1000 volts to more than 100,000 volts at a frequency of at least 200,000 cycles per second, the extent of treatment by said discharge being between about 1 watt-second and about 100-watt-seconds per square inch of film surface, and thereafter extrusion-coating onto the treated surface a layer of an ethylene polymer at a temperature between about 75° C. and no higher than 10° C. below the deorientation temperature of the biaxially oriented film.

The accompanying drawing illustrates diagrammatically a preferred embodiment of the process of this invention.

In the preferred practice of this invention a continuous self-supporting film of a biaxially oriented polymer is passed continuously between a set of spaced electrodes consisting of a rotating metal roll which is connected electrically to ground and to one or more stationary hollow metal tubes disposed parallel to the longitudinal axis of the roll and spaced a distance of from 0.03 to 0.125 inch from the surface thereof as illustrated in the drawing. The tube or tubes constituting the positive electrode are connected electrically to a suitable power source such as the Lepel High Frequency Spark Generator, which supplies alternating or pulsating current of the required voltage and frequency. A gaseous atmosphere consisting of the vapor of ethylene or propylene is fed continuously to the hollow interior of the electrode tube through distributor ducts and issues from the tube through suitable openings therein at the gap between the tube and the roll. Alternatively, the vapors may be introduced into the gap through one or more tubes separate from the electrode assembly. The electrical discharge takes place in the atmosphere containing the organic vapors. The assembly just described is suitably enclosed in a chamber held at substantially atmospheric pressure and provided with the necessary openings to facilitate maintenance of the atmosphere of the olefin vapor therein and to permit controlled exhaust of the vapors therefrom, to minimize operational hazards.

Thereafter, a layer of ethylene polymer is applied to the treated film surface. This can be done most conveniently by the well known method of melt extrusion coating; or, if desired, a preformed layer of the ethylene polymer can be applied to the treated surface by an extrusion lamination wherein a thin layer of ethylene polymer is used as the adhesive layer. The important consideration is that the temperature of the oriented base layer should reach at least 75° C. to promote adhesion to the applied layer, but should not exceed a temperature 10° C. below the deorientation temperature of the base layer.

In carrying out the electrical discharge treatment the potential difference between the electrodes may vary from low voltages in the order of 1000 volts up to pulsating peaks voltages of 100,000 and above. In general, however, it is preferred to maintain the voltage in excess of 2000 to 3000 volts. The frequency of the discharge should be at least 200,000 cycles per second. The power to the high frequency spark generator (such as the Lepel High Frequency Spark Generator), and the time of exposure of an increment of film surface to the discharge should be such that the extent of treatment is within the range of from about 1 to about 100 watt-seconds/square inch of film surface, with a range of 20 to 80 watt-seconds/square inch being preferred.

The preferred ethylene polymer is a polyethylene resin having a density between 0.910 and 0.935 gram per cc. at 25° C. and a melt index between 1.0 and 25. The thickness of the polyethylene coating may be from 0.25 to 2.5 mils.

The following examples will serve to further illustrate the principles and practice of my invention. In the examples, a one mil thick base film is treated in the electrical discharge under the conditions specified and is thereafter melt-coated with a 2 mil thick layer of polyethylene having a density of 0.920 and a melt index of 4.0. The maximum temperature attained by the base layer is about 90° C. Sample strips of the laminate are then heat sealed at a temperature of 130° C., a pressure of 10 p.s.i. and a dwell time of 0.5 second. The force required to separate the 1 inch wide strips is measured under dry conditions and also after immersion for 1 hour in boiling water.

Example 1

A 1 mil thick biaxially oriented polypropylene film is treated in an electrical discharge powered by the Lepel High Frequency Spark Generator, Model HFSG with propylene gas supplied between the electrodes. The results are as follows:

| Sample | Watt, seconds per square inch [1] | Bond (g./inch) | | | |
|---|---|---|---|---|---|
| | | Olefin with $N_2$ | | Pure olefin | |
| | | Dry | Wet | Dry | Wet |
| 1 | 25 | 50 | 125 | B+T | 500 T |
| 2 | 50 | 100–250 | 150 | B+T | 400 T |
| 3 | 75 | 100–600 | 250 | B+T | 500 T |

[1] Based on input wattage of the generator.
B+T=break and tear. T=tear.

Poor wet adhesion is obtained at a low degree of treatment (1 watt-second/in.²) and also at a high degree of treatment (100 watt-seconds/in.²).

Example 2

Example 1 was repeated but with ethylene gas in the discharge in place of propylene gas. The results are as follows:

| Sample | Watt, seconds per square inch | Bond (g./inch) | | | |
|---|---|---|---|---|---|
| | | Olefin with $N_2$ | | Pure olefin | |
| | | Dry | Wet | Dry | Wet |
| 1 | 25 | 500 | 75 | 900+T | 850 |
| 2 | 50 | 150 | 250 | 900+T | 700+T |
| 3 | 75 | 200 | 125 | 400+T | 700+T |

The results of treatment at 1 and 100 watt-seconds per square inch are similar to those described above.

Example 3

Following the procedure described in Example 1 a film of biaxially oriented polyethylene terephthalate is treated with electrical discharge in the presence of propylene gas and ethylene gas as described and shown in the table to follow, and is thereafter extrusion-coated with a 2 mil thick layer of polyethylene as in Example 1. The maximum temperature attained by the oriented base layer during extrusion coating is about 100° C. The resulting laminates are characterized as follows:

| Sample | Watt, seconds per square inch | Bond (g./inch) | | | |
|---|---|---|---|---|---|
| | | Olefin with $N_2$ | | Pure olefin | |
| | | Dry | Wet | Dry | Wet |
| 1 | 25 | 700 | 50 | B+T | B+T |
| 2 | 50 | 600T | 125 | B+T | B+T |
| 3 | 75 | 500 | 115 | B+T | B+T |

Example 4

Example 3 was repeated except that ethylene gas was used instead of propylene in the electrical discharge gap. The results follow:

| Sample | Watt, seconds per square inch | Bond (g./inch) | | | |
|---|---|---|---|---|---|
| | | Olefin with $N_2$ | | Pure olefin | |
| | | Dry | Wet | Dry | Wet |
| 1 | 25 | 150 | 50 | 850T | 700T |
| 2 | 50 | 200–500 | 0–300 | 400T | 100–900 750T |
| 3 | 75 | 150 | 25 | 900T | 750T |

Experiments under conditions substantially duplicating those described under Examples 1, 2, 3 and 4 were carried out except that the Lepel High Frequency Spark Generator was replaced by a motor generator having a frequency in the range of 10 to 30 kilocycles and with a power rating of 200 to 400. In none of the cases wherein both biaxially oriented polypropylene and biaxially oriented polyethylene terephthalate were treated with propylene gas and with ethylene gas in the discharge and thereafter coated with polyethylene, was satisfactory wet adhesion obtained. Similarly, very poor adhesion results were obtained when the biaxially oriented film was treated with an electrical discharge in an atmosphere of nitrogen or air.

In addition to the films described above, other biaxially oriented films, for example, films of polyvinyl chloride, polyvinyl fluoride, nylon, etc., can be used as the base film in the process of this invention to provide strong, well adhered laminar structures.

What is claimed is:

1. The process which comprises subjecting the surface of a biaxially oriented film of an organic polymer to the action of a pulsating electrical discharge between spaced electrodes at substantially atmospheric pressure and an ambient temperature between about 20° and about 60° C., in an atmosphere consisting of a gaseous olefin hydrocarbon selected from the group consisting of ethylene and propylene, the electrical discharge being produced by a high frequency spark generator and characterized by voltages of from 1000 to pulsating peak voltages of 100,000 volts and above at a frequency of at least 200,000 cycles per second, the extent of treatment by said discharge being between about 1 watt-second and 100 watt-seconds per square inch of film surface; and thereafter extrusion coating onto the treated surface a layer of an ethylene polymer at a temperature between about 75° C. and no higher than 10° C. below the deorientation temperature of said film.

2. The process of claim 1 wherein the ethylene polymer is polyethylene having a density between 0.910 and 0.935 gram per cubic centimeter at 25° C., and a melt index between 1.0 and 25.

3. The process of claim 1 wherein said film is polypropylene film.

4. The process of claim 1 wherein said film is polyethylene terephthalate film.

References Cited

UNITED STATES PATENTS

| 2,932,591 | 4/1960 | Goodman | 117—201 |
| 3,184,358 | 5/1965 | Utz | 156—244 |
| 3,274,089 | 10/1963 | Wolinski | 204—165 |

ALFRED L. LEAVITT, *Primary Examiner.*

W. E. BALL, *Assistant Examiner.*

U.S. Cl. X.R.

117—93.1, 138.8; 204—165